(12) United States Patent
Wu

(10) Patent No.: US 7,546,726 B1
(45) Date of Patent: Jun. 16, 2009

(54) CHAIN WITH PROTECTION DEVICE

(75) Inventor: Daniel Wu, Tainan (TW)

(73) Assignee: KMC Chain Industrial Co., Ltd., Yongkang (TW)

( * ) Notice: Subject to any disclaimer, the term of this patent is extended or adjusted under 35 U.S.C. 154(b) by 0 days.

(21) Appl. No.: 12/145,710

(22) Filed: Jun. 25, 2008

(30) Foreign Application Priority Data

Nov. 26, 2007 (TW) .............................. 96144872 A

(51) Int. Cl.
  *F16G 13/06* (2006.01)
  *F16G 15/00* (2006.01)
(52) U.S. Cl. ................................ 59/78; 59/78.1; 59/84; 59/93; 198/851
(58) Field of Classification Search ...................... 59/78, 59/78.1, 84, 93; 474/206, 207, 226; 198/850, 198/851
See application file for complete search history.

(56) References Cited

U.S. PATENT DOCUMENTS

| | | | | |
|---|---|---|---|---|
| 2,954,113 A | * | 9/1960 | Hibbard et al. ............. | 198/851 |
| 4,114,467 A | * | 9/1978 | Petershack .................. | 198/851 |
| 4,747,261 A | * | 5/1988 | Frenker-Hackfort ........... | 59/84 |
| 5,042,244 A | * | 8/1991 | Worsley ........................ | 59/78 |
| 5,249,415 A | * | 10/1993 | Frenker-Hackfort ........ | 59/78.1 |
| 6,662,545 B1 | * | 12/2003 | Yoshida .......................... | 59/78 |
| 6,945,388 B2 | * | 9/2005 | Schumacher ................ | 198/851 |
| 7,428,964 B2 | * | 9/2008 | Yoshida ...................... | 198/850 |

* cited by examiner

*Primary Examiner*—David B Jones
(74) *Attorney, Agent, or Firm*—Frommer Lawrence & Haug LLP; Ronald R. Santucci

(57) ABSTRACT

A chain includes a chain unit. The chain unit includes a pair of first and second plate units, a link pin extending in an inner-to-outer direction, and a protective member. Each of the first and second plate units includes two chain plates adjacent to and arranged in the inner-to-outer direction and having an inner side surface. The inner side surfaces of the first and second plate units face each other. The link pin interconnects the plate units to define a between-plate space between the inner side surfaces of the first and second plate units. The protective member extends integrally from the topside of at least one of the chain plates of the first chain plate, is spaced apart from the second chain plate, and has a shielding portion for covering at least a portion of an upper end of the between-plate space.

15 Claims, 14 Drawing Sheets

US 7,546,726 B1

CHAIN WITH PROTECTION DEVICE

CROSS-REFERENCE TO RELATED APPLICATION

This application claims priority of Taiwanese application no. 096144872 filed on Nov. 26, 2007, the disclosure of which is incorporated herein by reference.

BACKGROUND OF THE INVENTION

1. Field of the Invention

This invention relates to a chain, and more particularly to a chain that includes a protection device for shielding the chain from dust and the like.

2. Description of the Related Art

Referring to FIGS. 1 and 2, a conventional chain 1 includes a protection device consisting of a plurality of inverted U-shaped protective covers 3. The protective covers 3 protect a plurality of plate units 11 from dust and the like. However, the volume of the protective covers 3 are large, thereby increasing the total weight and manufacturing costs of the chain 1 and affecting adversely smooth movement of the conventional chain 1.

SUMMARY OF THE INVENTION

The object of this invention is to provide a chain that includes an improved protection device that can shield a between-plate space in the chain from dust and the like and that can overcome the above-mentioned disadvantages associated with the prior art.

According to this invention, a chain includes a chain unit. The chain unit includes a pair of first and second plate units, a link pin extending in an inner-to-outer direction, and a protective member. Each of the first and second plate units includes two chain plates adjacent to and arranged in the inner-to-outer direction and having an inner side surface. The inner side surfaces of the first and second plate units face each other. The link pin interconnects the plate units to define a between-plate space between the inner side surfaces of the first and second plate units. The protective member extends integrally from the topside of one of the chain plates of the first chain plate, is spaced apart from the second chain plate, and has a shielding portion for covering at least a portion of an upper end of the between-plate space.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
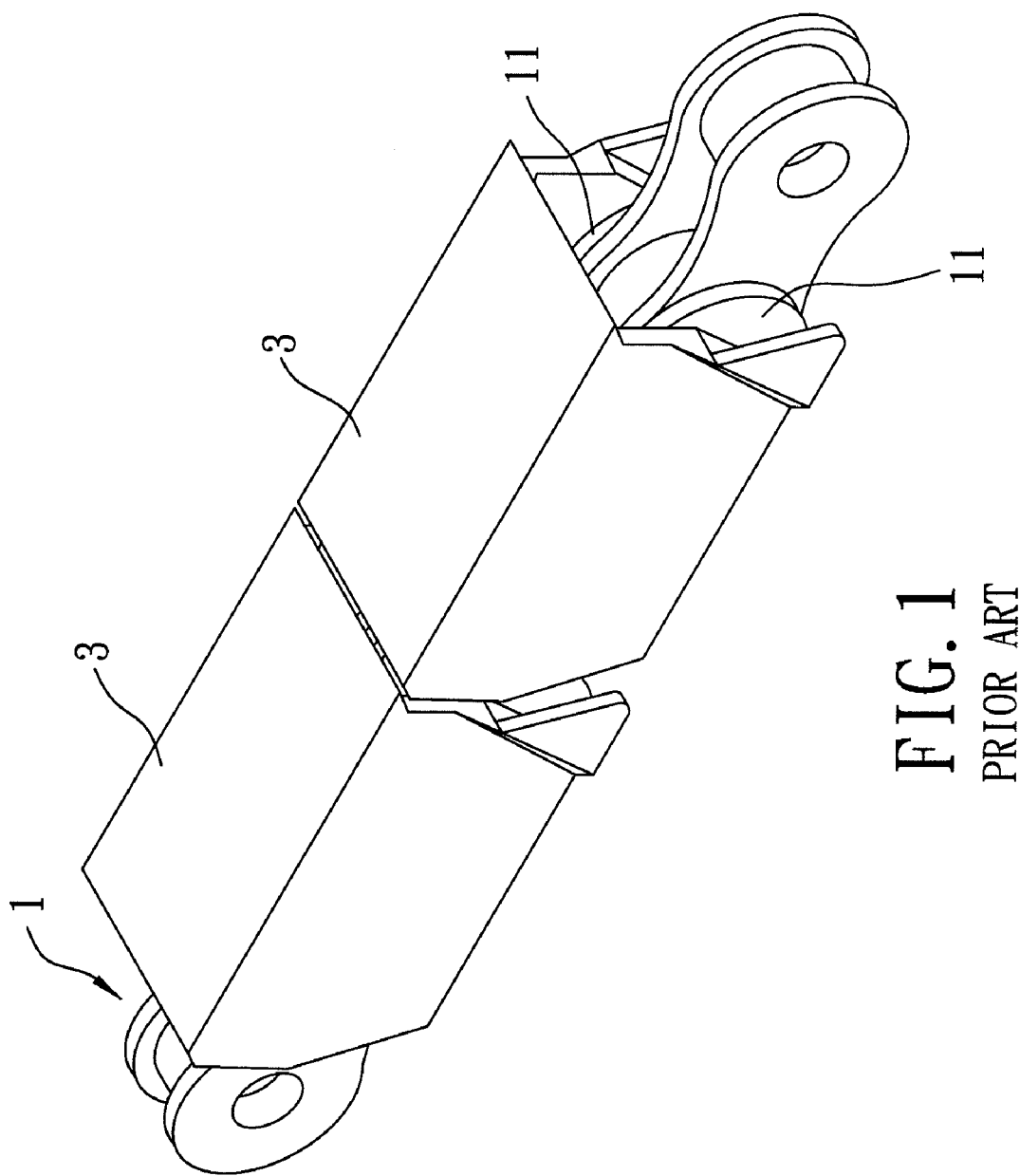
FIG. 1 is a perspective view of a portion of a conventional chain.
Figure 2:
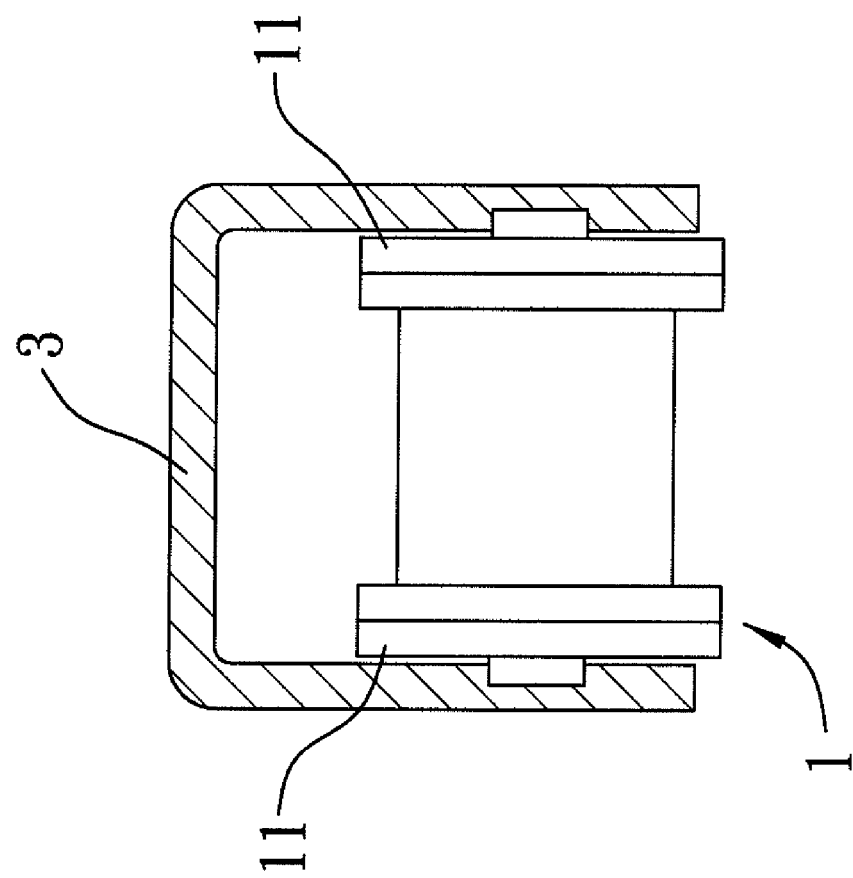
FIG. 2 is a partly sectional side view of the portion of the conventional chain, illustrating positioning of a protective cover relative to two plate units.

Before the present invention is described in greater detail in connection with the preferred embodiments, it should be noted that similar elements and structures are designated by like reference numerals throughout the entire disclosure.

Figure 3:
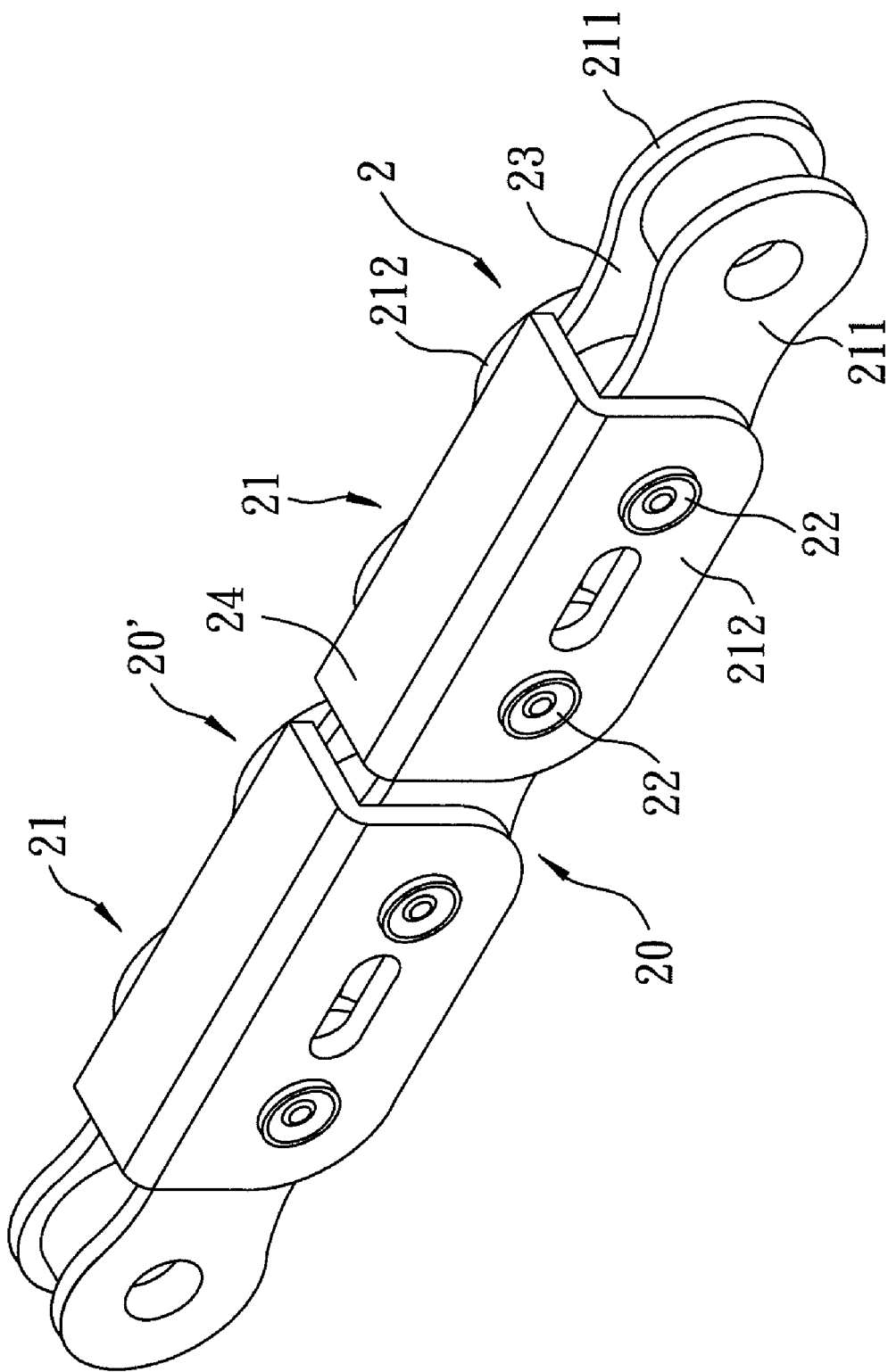
FIG. 3 is a fragmentary perspective view of the first preferred embodiment of a chain according to this invention, illustrating two chain units.
Figure 4:
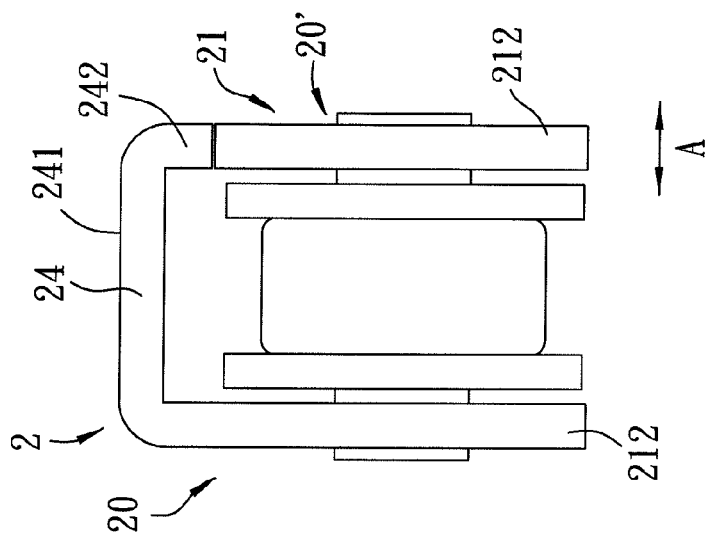
FIG. 4 is a side view of one of the chain units of the first preferred embodiment.

Referring to FIGS. 3 and 4, the first preferred embodiment of a chain 2 according to this invention includes a plurality of chain units 21 (only two are shown in FIG. 3). Each of the chain units 21 includes a pair of first and second plate units 20, 20' each having an inner side surface 201, a link pin 22 extending in an inner-to-outer direction (A) and interconnecting the first and second plate units 20, 20' to define a between-plate space 23 between the inner side surfaces 201 of the first and second plate units 20, 20', and a protection device including a protective member 24. Two adjacent ones of the chain units 21 are shown in FIG. 3, and are interconnected by an additional link pin 22. One of the chain units 21 will be described hereinafter.

The inner side surfaces 201 of the first and second plate units 20, 20' face each other. Each of the first and second plate units 20, 20' includes a pair of flat inner and outer chain plates 211, 212 adjacent to each other and arranged in the inner-to-outer direction (A). The inner chain plates 211 of the first and second plate units 20, 20' are located between the outer chain plates 212 of the first and second plate units 20, 20'.

In this embodiment, the protective member 24 is configured as a rectangular horizontal plate, and extends integrally from a topside of the outer chain plate 212 of the first plate unit 20 toward a topside of the outer chain plate 212 of the second plate unit 20' in the inner-to-outer direction (A), and ends at a position adjacent to and spaced apart from the topside of the outer chain plate 212 of the second plate unit 20' in the inner-to-outer direction (A). The topside of the outer chain plate 212 of the first plate unit 20 is disposed below the topside of the outer chain plate 212 of the second plate unit 20'. The protective member 24 has a shielding portion 240 for covering an upper end of the between-plate space 23. As such, the protective member 24 is able to prevent the chain unit 21 from dust and the like and to increase the structural strength of the chain unit 21.

Figure 5:
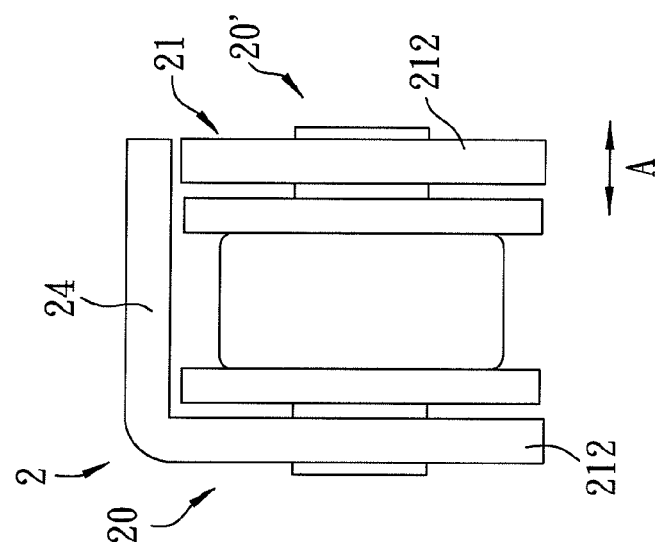
FIGS. 5 to 9 are respectively side views of chain units of the second, third, fourth, fifth, and sixth preferred embodiments of a chain according to this invention.

FIG. 5 shows one chain unit 21 of the second preferred embodiment of a chain 2 according to this invention, which is similar in construction to that of the first preferred embodiment. In this embodiment, the topsides of the outer chain plates 212 of the first and second plate units 20, 20' are aligned with each other in the inner-to-outer direction (A), and the protective member 24 ends at a position adjacent to, spaced apart from, and located directly above the topside of the outer chain plate 212 of the second plate unit 20'.

Figure 6:
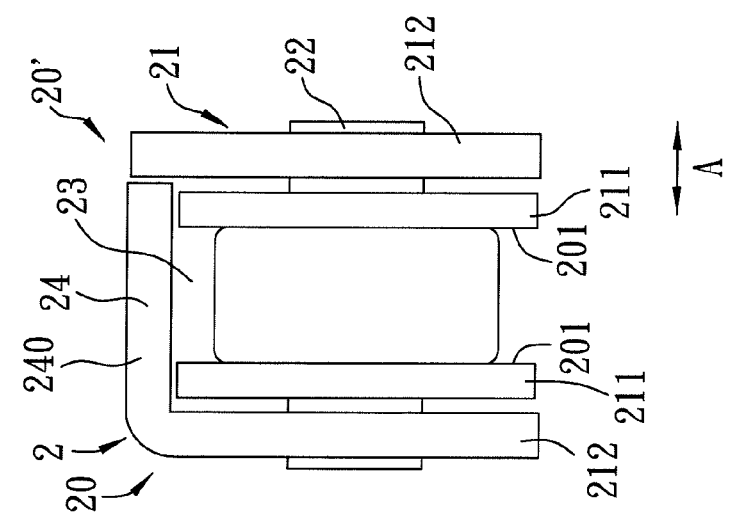

FIG. 6 shows one chain unit 21 of the third preferred embodiment of a chain 2 according to this invention, which is similar in construction to that of the first preferred embodiment. In this embodiment, the topside of the outer chain plate 212 of the first plate unit 20 is disposed above the topside of the outer chain plate 212 of the second plate unit 20', and the protective member 24 is L-shaped, and has a horizontal plate portion 241 extending from the topside of the outer chain plate 212 of the first plate unit 20 and ending at a position directly above the topside of the outer chain plate 212 of the second plate unit 20', and a vertical plate portion 242 extending downwardly from the horizontal plate portion 241 toward the topside of the outer chain plate 212 of the second plate unit 20' and ending at a position adjacent to and spaced apart from the topside of the outer chain plate 212 of the second plate unit 20' in a direction perpendicular to the inner-to-outer direction (A).

Figure 8:
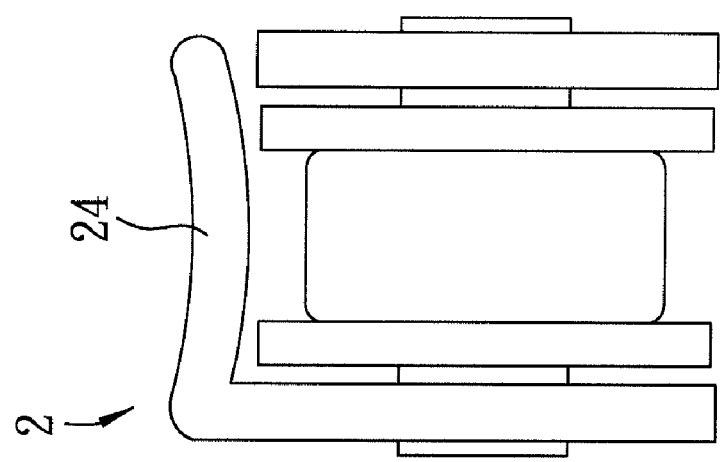
Figure 7:
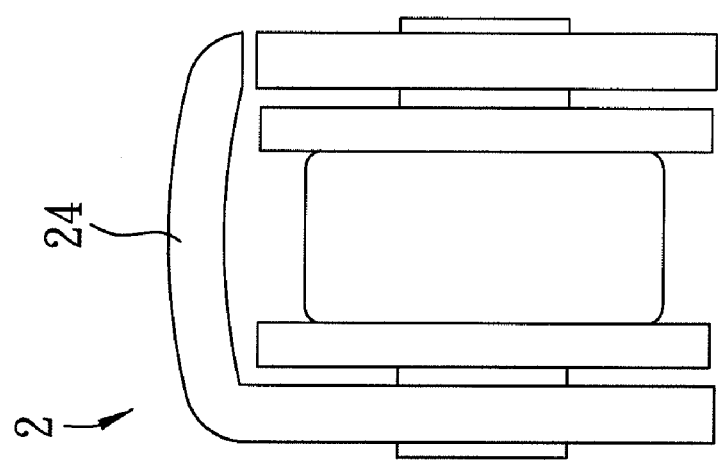

FIGS. 7 and 8 show respectively the chain units 21 of the fourth and fifth preferred embodiments of a chain 2 according to this invention, each of which is similar in construction to that of the second preferred embodiment. In each of these embodiments, the protective member 24 is configured as a curved plate. In the fourth preferred embodiment, the protective member 24 is concaved upwardly. In the fifth preferred embodiment, the protective member 24 is concaved downwardly.

Figure 9:
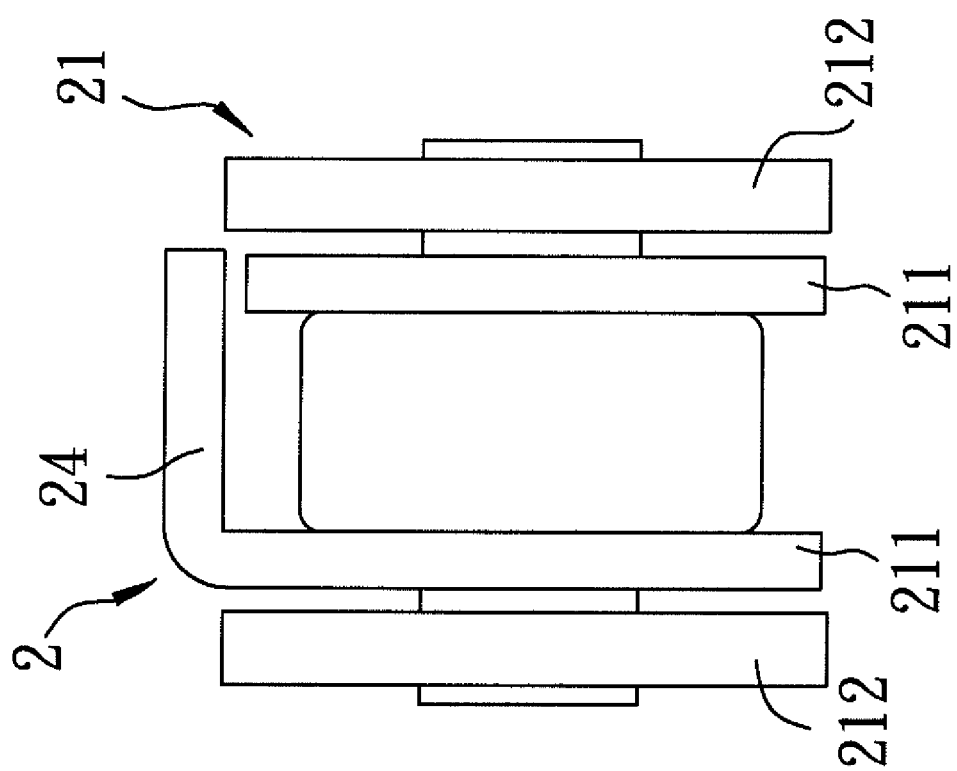

FIG. 9 shows one chain unit 21 of the sixth preferred embodiment of a chain 2 according to this invention, which is similar in construction to that of the second preferred embodiment except that the protective member 24 extends from a topside of the inner chain plate 211 of the first plate unit 20, and ends at a position disposed directly above and adjacent to a topside of the inner chain plate 211 of the second plate unit 20'.

Alternatively, in this embodiment, the shape of the protective member 24, the heights of the inner chain plates 211, and the relative position between the protective member 24 and the inner chain plates 211 may be modified in the manner in which the protective member 24 and the outer chain plates 212 are arranged relative to each other in the first, third, fourth, or fifth preferred embodiment.

Figure 10:
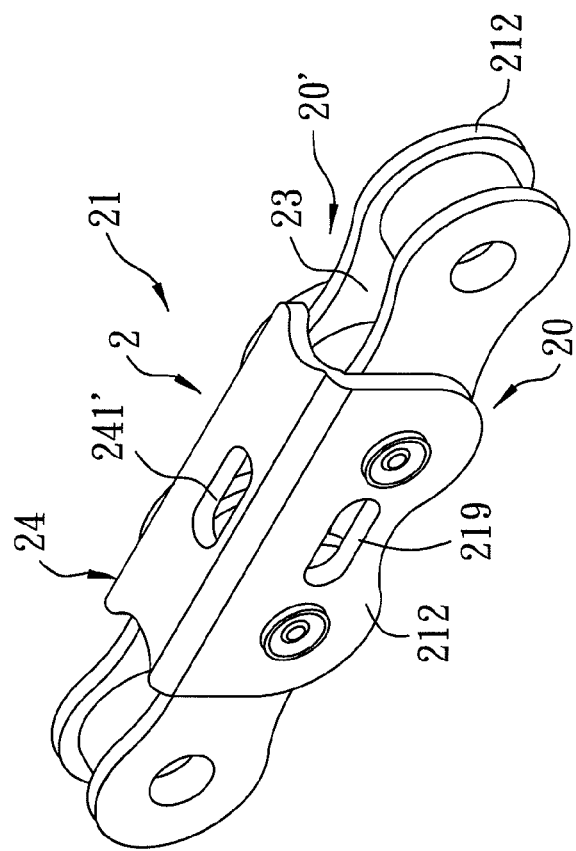

FIG. 10 shows one chain unit 21 of the seventh preferred embodiment of a chain 2 according to this invention, which is similar in construction to that of the first preferred embodiment. In this embodiment, the protective member 24 has two opposite end surfaces that are inwardly concaved, and each of the protective member 24 and the outer chain plates 212 of the first and second plate units 20, 20' has a through hole 241' formed therethrough and in spatial communication with the between-plate space 23 for weight reducing purposes. To further reduce the total weight of the chain unit 21, each of a bottom side of the outer chain plate 212 of the first plate unit 20 and top and bottom sides of the outer chain plate 212 of the second plate unit 20' is concaved inwardly at a middle portion thereof, and the outer chain plate 212 of each of the first and second plate units 20, 20' has a through hole 219 formed through a middle portion thereof. Corners of the protective member 24 are curved to reduce wearing when they are subjected to impact.

Figure 11:
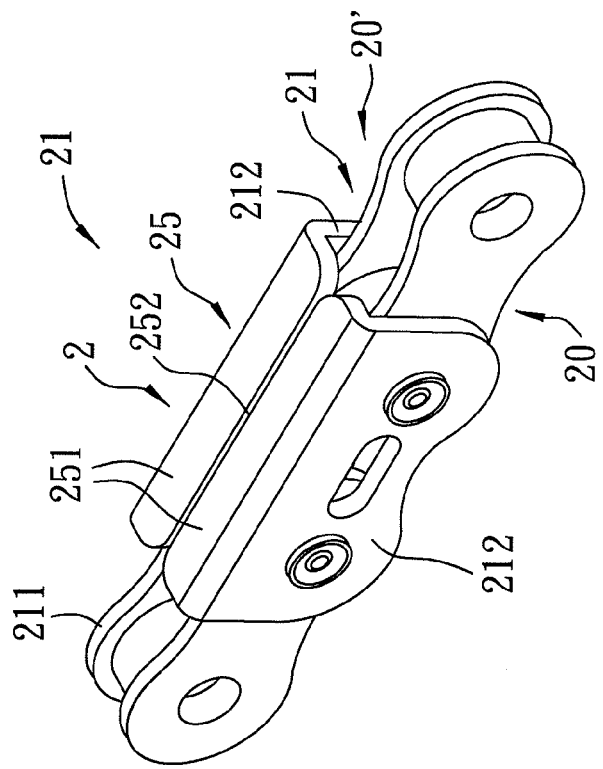
FIGS. 10 to 13 are respectively perspective views chain units of the seventh, eighth, ninth, and tenth preferred embodiments of a chain according to this invention.
Figure 12:
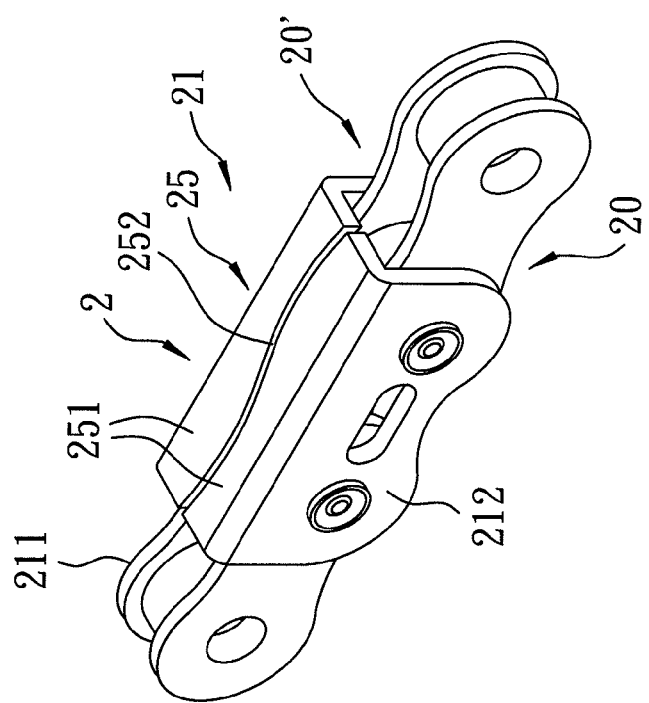

FIGS. 11 and 12 show respectively the chain units 21 of the eighth and ninth preferred embodiments of a chain 2 according to this invention, each of which is similar in construction to that of the first preferred embodiment. In each of these embodiments, the protection device 25 includes spaced-apart first and second protective members 251 configured as two cover plates extending respectively from the topsides of the outer chain plates 212 of the first and second plate units 20, 20' toward each other to define a gap 252 therebetween. The shapes of the gaps 252 of the eighth and ninth preferred embodiments are a straight line, and a curve line, respectively. The first and second protective members 251 also have curved corners.

Figure 13:
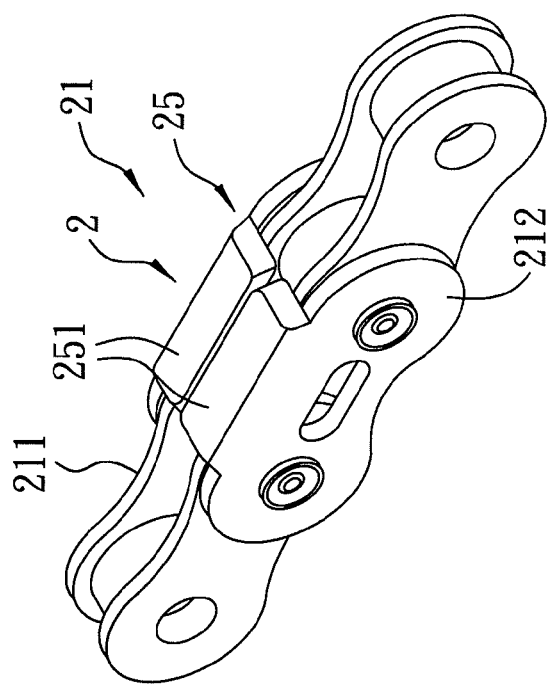

FIG. 13 shows one chain unit 21 of the tenth preferred embodiment of a chain 2 according to this invention, which is similar in construction to that of the eighth preferred embodiment. In this embodiment, the first and second protective members 251 are rectangular, are shorter than the outer chain plates 212, and each of the first and second protective members 251 has two opposite end surfaces, at least one of which is inclined outwardly and downwardly.

Figure 16:
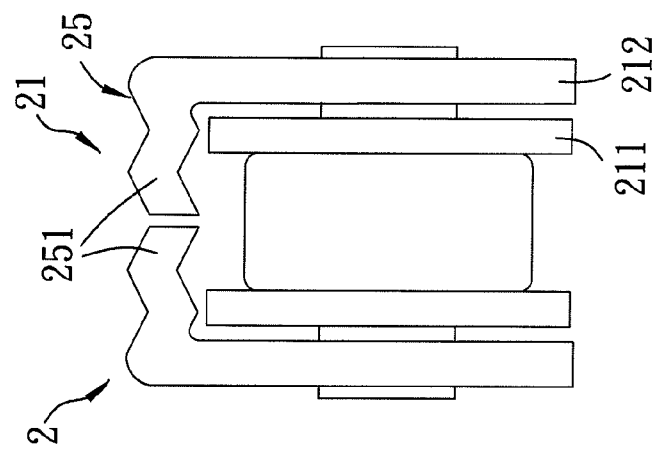
FIGS. 14 to 16 are respectively side views of chain units of the eleventh, twelfth, and thirteenth preferred embodiments of a chain according to this invention.
Figure 15:
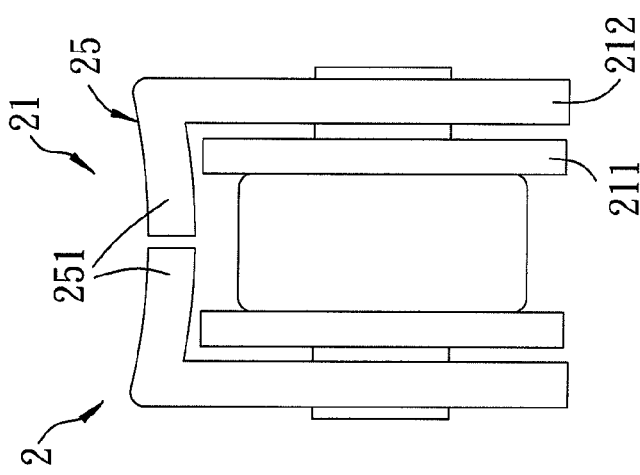
Figure 14:
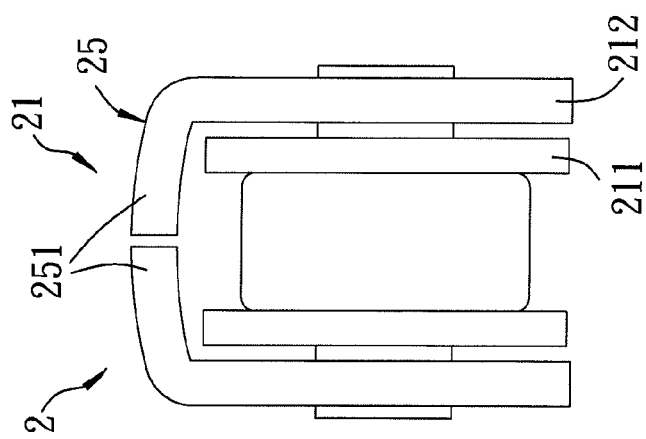

FIGS. 14 to 16 show respectively the chain units 21 of the eleventh, twelfth, and thirteenth preferred embodiments of a chain 2 according to this invention, each of which is similar in construction to that of the eighth preferred embodiment. In the eleventh preferred embodiment, the first and second protective members 251 are curved, and extend inwardly and upwardly. In the twelfth preferred embodiment, the first and second protective members 251 are also curved, and extend inwardly and downwardly. In the thirteenth preferred embodiment, the first and second protective members 251 are corrugated.

Figure 17:
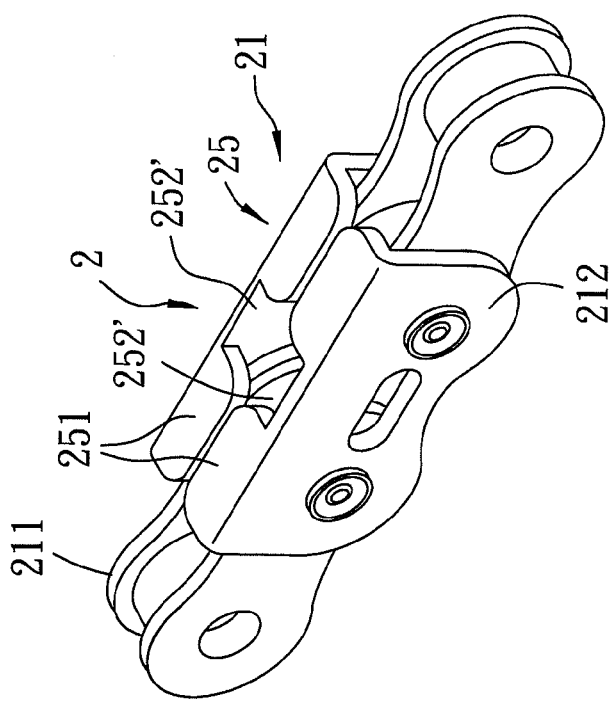

FIG. 17 shows one chain unit 21 of the fourteenth preferred embodiment of a chain 2 according to this invention, which is similar in construction to that of the eighth preferred embodiment. In this embodiment, each of the first and second protective members 251 is formed with a notch 252' at a middle portion thereof, and curved corners.

Figure 18:
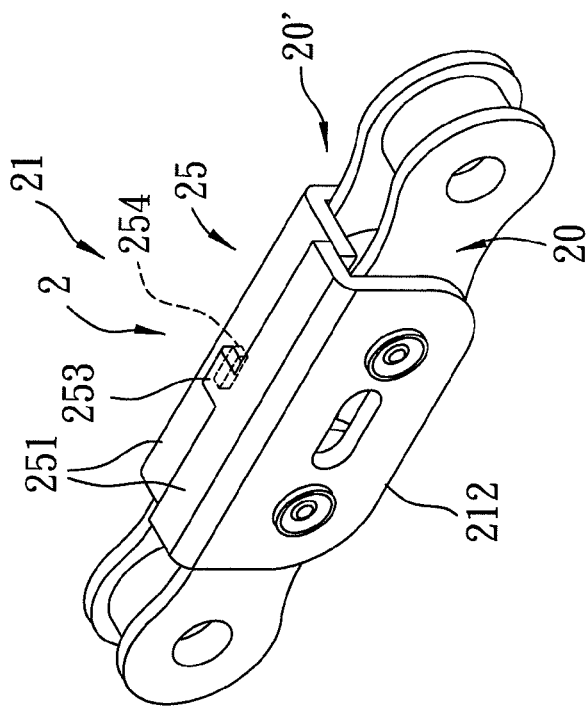
FIGS. 17 and 18 are respectively perspective views of chain units of the fourteenth and fifteenth preferred embodiments of a chain according to this invention.

FIG. 18 shows one chain unit 21 of the fifteenth preferred embodiment of a chain 2 according to this invention, which is similar in construction to that of the eighth preferred embodiment. In this embodiment, the second protective member 251 is formed with a retaining groove 254, and the first protective member 251 includes a retaining hook 253 engaging the retaining groove 254 so as to prevent relative movement between the first and second protective members 251, thereby increasing the structural strength of the protective device 25 and improving dust protection and impact resistance of the first and second protective members 251.

Figure 19:
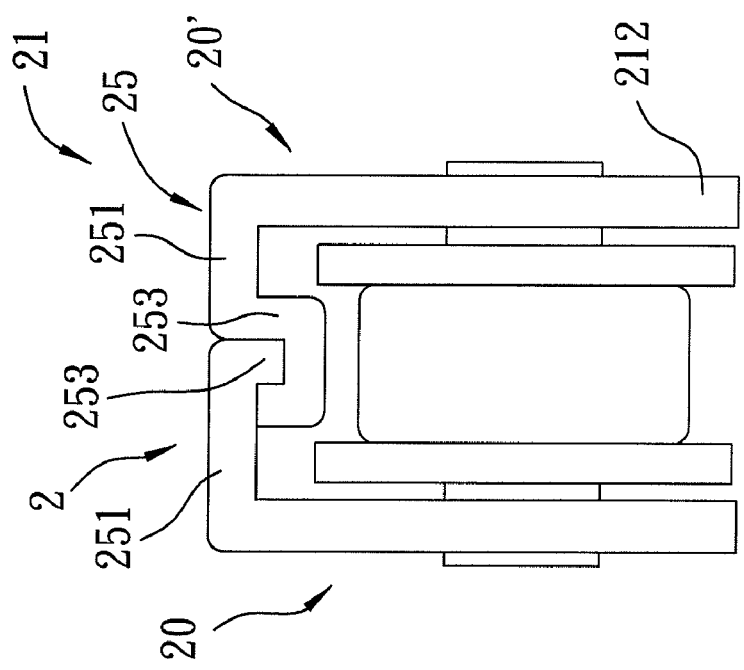

FIG. 19 shows one chain unit 21 of the sixteenth preferred embodiment of a chain 2 according to this invention, which is similar in construction to that of the eighth preferred embodiment. In this embodiment, the first and second protective members 251 are formed respectively with two retaining hooks 253 that engage each other and that are L-shaped and U-shaped, respectively.

Figure 20:
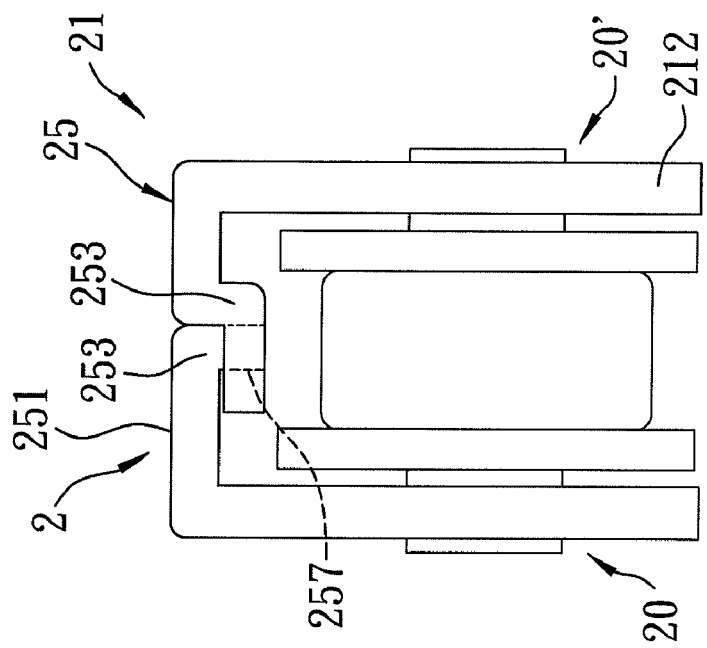
FIGS. 19 and 20 are respectively side views of chain units of the sixteenth and seventeenth preferred embodiments of a chain according to this invention.

FIG. 20 shows one chain unit 21 of the seventeenth preferred embodiment of a chain 2 according to this invention, which is similar in construction to that of the sixteenth preferred embodiment. In this embodiment, the retaining hooks 253 of the first and second protective members 251 are L-shaped. The retaining hook 253 of the second protective member 251 is formed with a retaining hole 257 to allow insertion of the retaining hook 253 of the first protective member 251 thereinto.

Figure 21:
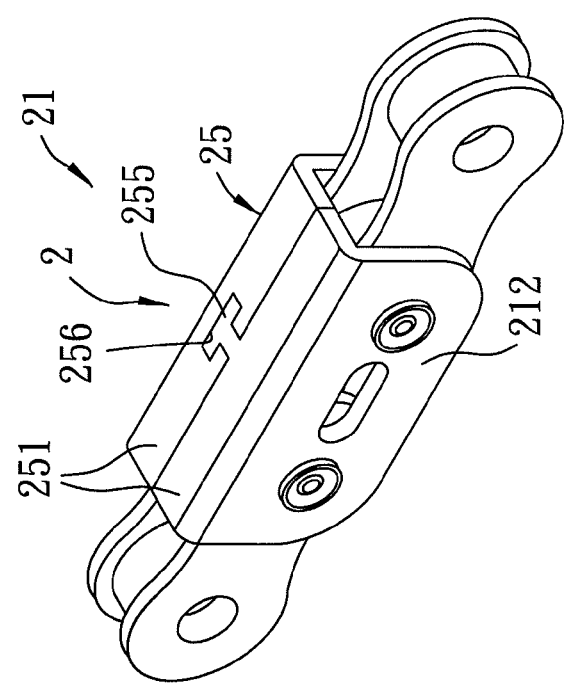

FIG. 21 shows one chain unit 21 of the eighteenth preferred embodiment of a chain 2 according to this invention, which is similar in construction to that of the eighth preferred embodiment. In this embodiment, the first and second protective members 251 include a T-shaped insert member 255 and a T-shaped retaining groove 256, respectively. The T-shaped insert member 255 is received fittingly within the T-shaped retaining groove 256.

Figure 22:
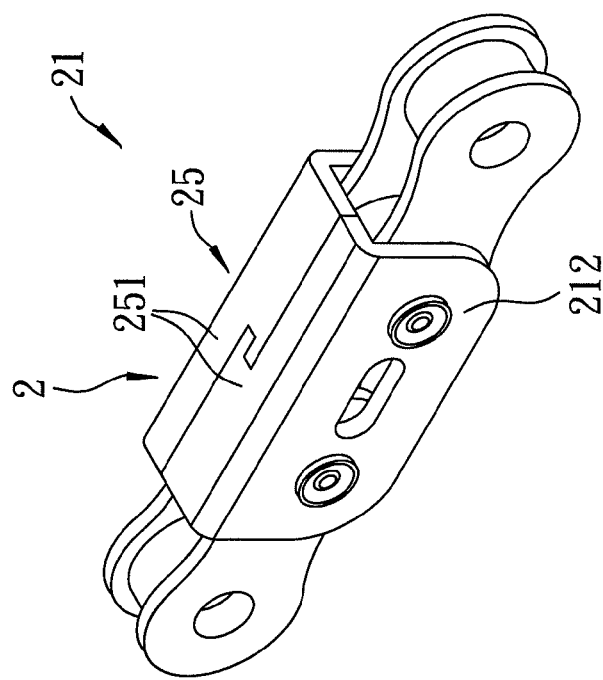
FIGS. 21 and 22 are respectively perspective views of the eighteenth and nineteenth preferred embodiments of a chain according to this invention.

FIG. 22 shows one chain unit 21 of the nineteenth preferred embodiment of a chain 2 according to this invention, which is similar in construction to that of the eighth preferred embodiment. In this embodiment, the first and second protective members 251 are configured respectively as two J-shaped hooks that engage each other.

Figure 23:
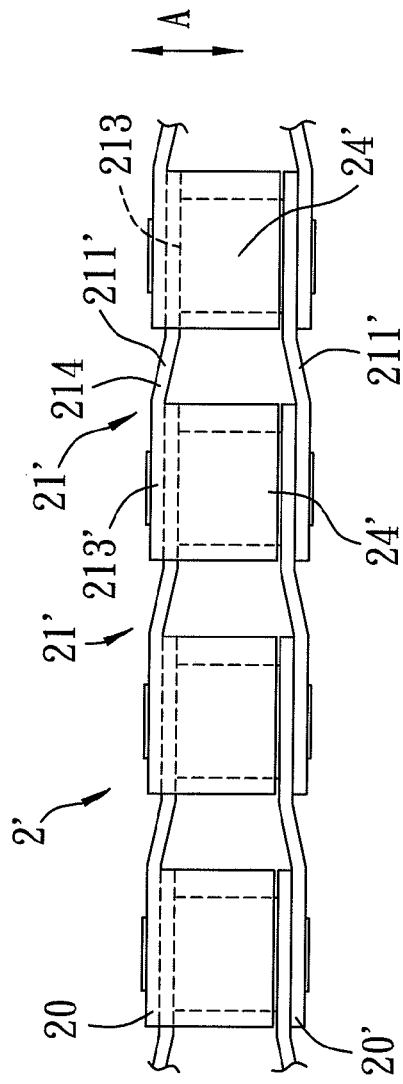
FIGS. 23 and 24 are respectively fragmentary top views of the twentieth and twenty-first preferred embodiments of a chain according to this invention.
Figure 25:
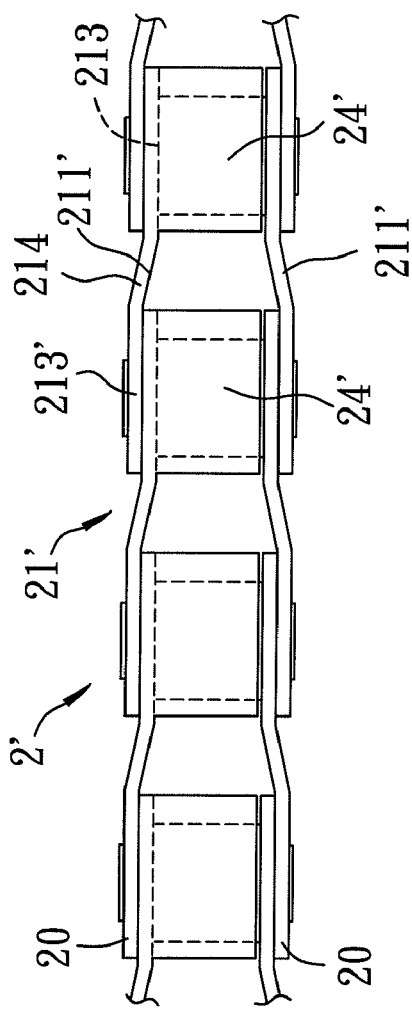
FIGS. 25 and 26 are respectively fragmentary top views of the twenty-second and twenty-third preferred embodiments of a chain according to this invention.

FIG. 23 is a fragmentary top view of the twentieth preferred embodiment of a chain 2' according to this invention, which is similar in construction to the first preferred embodiment. In this embodiment, each of the first and second plate units 20, 20' of each of the chain units 21' includes two chain plates 211' each having a pair of inner and outer plate portions 213, 213' perpendicular to the inner-to-outer direction (A), and an inclined plate portion 214 interconnecting the inner and outer plate portions 213, 213' and extending in a direction inclined relative to the inner-to-outer direction (A). For each of the chain units 21', the inner plate portions 213 are located between the outer plate portions 213', and the protection device includes two long protective members 24' extending respectively from the outer plate portions 213' of the chain plates 211' of the first plate unit 20, covering at least a portion of an upper end of the between-plate space, and adjacent respectively to and spaced respectively apart from the inner plate portions 213 of the chain plates 211' of the second plate unit 20' in the inner-to-outer direction (A). Alternatively, the long protective members 24' may extend respectively from the inner plate portions 213 of the chain plates 211' of the first plate unit 20, as shown in FIG. 25. In addition, the protection device may include only one long protective member 24' extending from one of the inner and outer plate portions 213, 213' of the chain plates 211' of the first and second plate units 20,20' of the chain units 21'.

Figure 24:
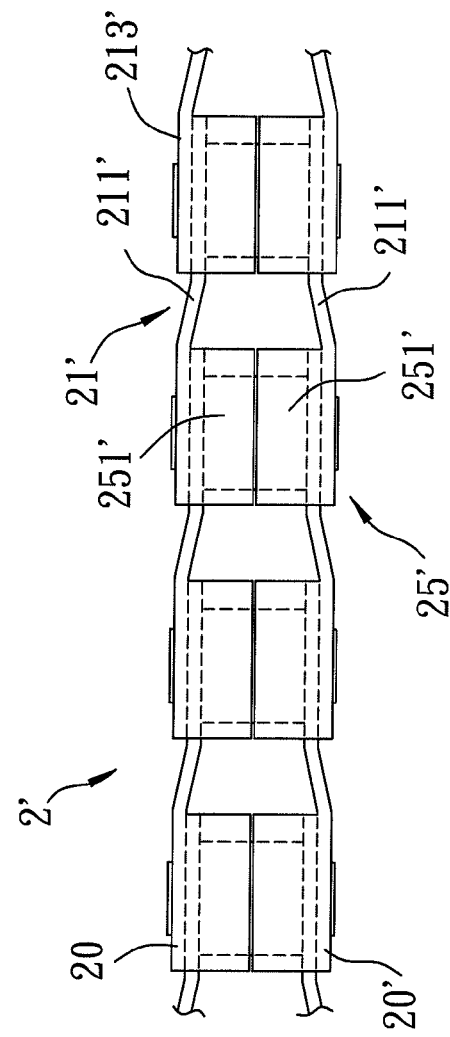
Figure 26:
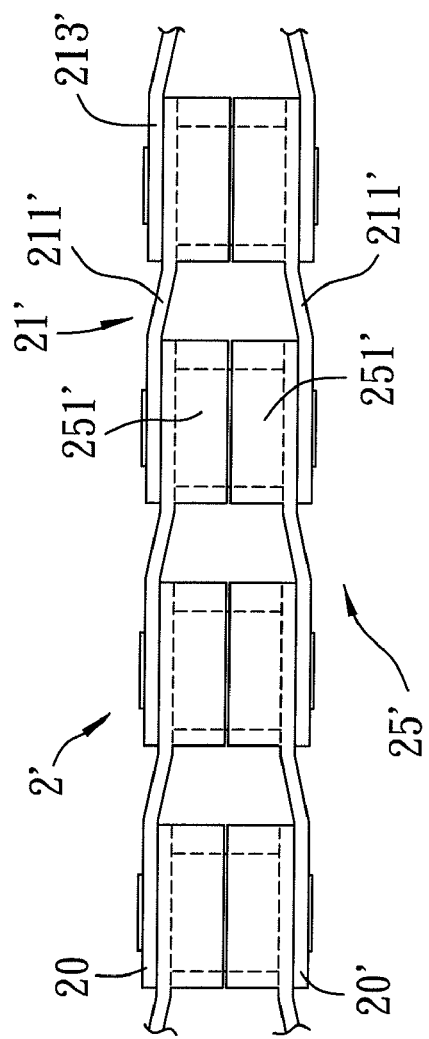

FIG. 24 shows a portion of the twenty-first preferred embodiment of a chain 2' according to this invention, which is similar in construction to the twentieth preferred embodiment except that each of the long protective members 24' are replaced with an adjacent pair of spaced-apart short protective members 251'. Each pair of the short protective members 251' of the protection devices 25' is adjacent to and spaced apart from each other, and extends respectively from the outer plate portions 213' of a corresponding adjacent pair of the chain plates 211' of the first and second plate units 20, 20' toward each other. Each of the short protective members 251' covers at least a portion of an upper end of the between-plate space. Alternatively, the short protective members 251' may extend respectively from the inner plate portions 213 of the chain plates 211' of the first and second plate units 20,20', as shown in FIG. 26.

Alternatively, any of the protective members 24 and the first and second protective members 251 of the chain plates 21 shown in FIGS. 10 to 22 may be formed integrally with the topside of the inner chain plate 211.

In addition, in the embodiments shown in FIGS. 11 to 17, the bottom side of any of the outer chain plates 212 may have a flat middle portion, any of the first and second protective members 251 and the inner and outer chain plates 211, 212 may be formed with at least one hole for weight reducing purposes, and the first and second protective members 251 may be shorter than the outer chain plates 212, Further, in the embodiments shown in FIGS. 18 to 22, any of the outer chain plates 212 may have at least one of a concaved bottom side and the first and second protective members 251 may be shorter than the outer chain plates 212.

With this invention thus explained, it is apparent that numerous modifications and variations can be made without departing from the scope and spirit of this invention. It is therefore intended that this invention be limited only as indicated by the appended claims.

I claim:

1. A chain including a chain unit, said chain unit comprising:
   a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
   a link pin interconnecting said plate units to define a between-plate space between said inner side surfaces of said first and second plate units and extending in the inner-to-outer direction; and
   a protection device including a first protective member extending integrally from said topside of at least one of said chain plates of said first plate unit, spaced apart from said second plate unit, and having a shielding portion for covering at least a portion of an upper end of said between-plate space;
   wherein said chain plates of each of said first and second plate units are configured as inner and outer chain plates, said inner chain plates of said first and second plate units being located between said outer chain plates of said first and second plate units;
   wherein said first protective member is configured as a plate, and extends from said topside of said outer chain plate of said first plate unit toward said topside of said outer chain plate of said second plate unit;
   wherein said topside of said outer chain plate of said first plate unit is disposed below said topside of said outer chain plate of said second plate unit, said first protective member extending from said topside of said outer chain plate of said first plate unit toward said topside of said outer chain plate of said second plate unit and ending at a position adjacent to and spaced apart from said topside of said outer chain plate of said second plate unit in the inner-to-outer direction.

2. A chain including a chain unit, said chain unit comprising:
   a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
   a link pin interconnecting said plate units to define a between-plate space between said inner side surfaces of said first and second plate units and extending in the inner-to-outer direction; and
   a protection device including a first protective member extending integrally from said topside of at least one of said chain plates of said first plate unit, spaced apart from said second plate unit, and having a shielding portion for covering at least a portion of an upper end of said between-plate space;
   wherein said chain plates of each of said first and second plate units are configured as inner and outer chain plates, said inner chain plates of said first and second plate units being located between said outer chain plates of said first and second plate units;
   wherein said first protective member is configured as a plate, and extends from said topside of said outer chain plate of said first plate unit toward said topside of said outer chain plate of said second plate unit;

wherein said topside of said outer chain plate of said first plate unit is disposed above said topside of said outer chain plate of said second plate unit, said first protective member being L-shaped and having a horizontal plate portion extending from said topside of said outer chain plate of said first plate unit and ending at a position directly above said topside of said outer chain plate of said second plate unit, and a vertical plate portion extending downwardly from said horizontal plate portion toward said topside of said outer chain plate of said second plate unit and ending at a position adjacent to and spaced apart from said topside of said outer chain plate of said second plate unit in a direction perpendicular to the inner-to-outer direction.

3. A chain including a chain unit, said chain unit comprising:
- a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
- a link pin interconnecting said plate units to define a between-plate space between said inner side surfaces of said first and second plate units and extending in the inner-to-outer direction; and
- a protection device including a first protective member extending integrally from said topside of at least one of said chain plates of said first plate unit, spaced apart from said second plate unit, and having a shielding portion for covering at least a portion of an upper end of said between-plate space;

wherein said chain plates of each of said first and second plate units are configured as inner and outer chain plates, said inner chain plates of said first and second plate units being located between said outer chain plates of said first and second plate units;

wherein said first protective member is configured as a plate, extends from said topside of said inner chain plate of said first plate unit, and ends at a position adjacent to said topside of said inner chain plate of said second plate unit.

4. A chain including a chain unit, said chain unit comprising:
- a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
- a link pin interconnecting said plate units to define a between-plate space between said inner side surfaces of said first and second plate units and extending in the inner-to-outer direction; and
- a protection device including a first protective member extending integrally from said topside of at least one of said chain plates of said first plate unit, spaced apart from said second plate unit, and having a shielding portion for covering at least a portion of an upper end of said between-plate space;

wherein said chain plates of each of said first and second plate units are configured as inner and outer chain plates, said inner chain plates of said first and second plate units being located between said outer chain plates of said first and second plate units;

wherein said protection device further includes a second protective member, said first and second protective members being configured as two cover plates, respectively, and extending respectively from said topsides of said outer chain plates of said first and second plate units toward each other.

5. The chain as claimed in claim 4, wherein said cover plates are spaced apart from each other to define a gap therebetween, said gap having a shape that is one of a straight line and a curved line.

6. The chain as claimed in claim 4, wherein each of said first and second protective members has at least one hole formed therethrough and in spatial communication with said between-plate space.

7. The chain as claimed in claim 4, wherein one of said first and second protective members is formed with a retaining groove, and the other one of said first and second protective members includes a retaining hook engaging said retaining groove so as to prevent relative movement between said first and second protective members.

8. The chain as claimed in claim 4, wherein said first and second protective members are formed respectively with two retaining hooks that engage each other.

9. The chain as claimed in claim 8, wherein said retaining hooks of said first and second protective members are L-shaped, one of said first and second protective members being formed with a retaining hole to allow insertion of the other of said first and second protective members thereinto.

10. The chain as claimed in claim 4, wherein said first and second protective members include a T-shaped insert member and a T-shaped retaining groove, respectively, said T-shaped insert member being received fittingly within said T-shaped retaining groove.

11. The chain as claimed in claim 4, wherein said first and second protective members are configured respectively as two J-shaped hooks that engage each other.

12. A chain including a chain unit, said chain unit comprising:
- a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
- a link pin interconnecting said plate units to define a between-plate space between said inner side surfaces of said first and second plate units and extending in the inner-to-outer direction; and
- a protection device including a first protective member extending integrally from said topside of at least one of said chain plates of said first plate unit, spaced apart from said second plate unit, and having a shielding portion for covering at least a portion of an upper end of said between-plate space;

wherein said first protective member has at least one hole formed therethrough and in spatial communication with said between-plate space.

13. A chain including a chain unit, said chain unit comprising:
- a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;
- a link pin interconnecting said plate units to define a between-plate space between said inner side surfaces of said first and second plate units and extending in the inner-to-outer direction; and a protection device including a first protective member extending integrally from said topside of at least one of said chain plates of said first plate unit, spaced apart from said second plate unit, and having a shielding portion for covering at least a portion of an upper end of said between-plate space;

wherein said first protective member is shorter than the one of said chain plates of said first plate unit.

14. A chain including a chain unit, said chain unit comprising:

a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;

a link pin interconnecting said plate units to define a between-plate space between said inner side surfaces of said first and second plate units and extending in the inner-to-outer direction; and a protection device including a first protective member extending integrally from said topside of at least one of said chain plates of said first plate unit, spaced apart from said second plate unit, and having a shielding portion for covering at least a portion of an upper end of said between-plate space;

wherein each of said chain plates of each of said first and second plate units has a pair of inner and outer plate portions perpendicular to the inner-to-outer direction, and an inclined plate portion interconnecting the inner and outer plate portions and extending in a direction inclined relative to the inner-to-outer direction, said inner plate portions of each of said first and second plate units being located between said outer plate portions of a corresponding one of said first and second plate units, said first protecting member including at least one long protective member extending from one of said inner and outer plate portions of one of said chain plates of said first plate unit and adjacent to and spaced apart from said chain plates of said second plate unit in the inner-to-outer direction.

15. A chain including a chain unit, said chain unit comprising:

a pair of first and second plate units, each of which includes two chain plates adjacent to each other and arranged in an inner-to-outer direction and has an inner side surface, said inner side surfaces of said first and second plate units facing each other, each of said chain plates of each of said first and second plate units having a topside;

a link pin interconnecting said plate units to define a between-plate space between said inner side surfaces of said first and second plate units and extending in the inner-to-outer direction; and a protection device including a first protective member extending integrally from said topside of at least one of said chain plates of said first plate unit, spaced apart from said second plate unit, and having a shielding portion for covering at least a portion of an upper end of said between-plate space, wherein each of said chain plates of each of said first and second plate units has a pair of inner and outer plate portions perpendicular to the inner-to-outer direction, and an inclined plate portion interconnecting the inner and outer plate portions and extending in a direction inclined relative to the inner-to-outer direction, said inner plate portions of each of said first and second plate units being located between said outer plate portions of a corresponding one of said first and second plate units, said protection device further including a second protective member, each of said first and second protective members including two short protective members adjacent to and spaced apart from each other and extending respectively from two of said chain plates of said first and second plate units toward each other in the inner-to-outer direction, each of said short protective members extending from one of said inner and outer plate portion of a corresponding one of said chain plates of said first and second plate units.

\* \* \* \* \*